United States Patent [19]

Morita

[11] Patent Number: 4,459,877

[45] Date of Patent: Jul. 17, 1984

[54] POSITIONING APPARATUS FOR INDEX TABLE IN CENTER COLUMN TYPE ROTARY INDEX MACHINE

[75] Inventor: Nobuo Morita, Narashino, Japan

[73] Assignee: Seiko Seiki Kabushiki Kaisha, Chiba, Japan

[21] Appl. No.: 305,367

[22] Filed: Sep. 24, 1981

[30] Foreign Application Priority Data

Oct. 23, 1980 [JP] Japan ................. 55-148497

[51] Int. Cl.$^3$ ........................................... B23Q 17/00
[52] U.S. Cl. ............................................... 74/813 L
[58] Field of Search .............. 74/813 L, 822; 269/238, 269/63; 72/306, 404; 100/223

[56] References Cited

U.S. PATENT DOCUMENTS

| 2,086,848 | 7/1937 | Bullard | 74/822 |
| 3,094,885 | 6/1963 | Flannery et al. | 74/813 L |
| 3,633,442 | 1/1972 | Stoen | 74/813 L |
| 3,786,721 | 1/1974 | Reda | 74/813 L |

FOREIGN PATENT DOCUMENTS

| 214368 | 4/1958 | Australia | 74/822 |
| 847565 | 7/1970 | Canada | 74/822 |

Primary Examiner—Kenneth Dorner
Assistant Examiner—Anthony W. Raskob, Jr.
Attorney, Agent, or Firm—Robert E. Burns; Emmanuel J. Lobato; Bruce L. Adams

[57] ABSTRACT

A center column type rotary index machine comprises a rotary index table which is intermittently rotated in angular increments to position a jig mounted on the index table at predetermined processing stations. A vertically movable center column undergoes upward and downward movement relative to a fixed frame portion of the machine. In order to ensure precise positioning of the jig at the processing stations, a clamp rod is slidably mounted on the fixed frame portion and is provided at its lower end with a taper portion which coacts with a complementary-shaped taper portion on the index table to position the index table so that the jig is precisely positioned at one of the processing stations. A link lever is pivotally mounted on the frame portion of the machine and has one lever arm pivotally connected to the upper end of the clamp rod and another lever arm pivotally connected to a slidable member which is slidably mounted in a sleeve affixed to the center column so that upward movement of the center column from its lowermost position effects pivotal movement of the link lever to cause downward movement of the clamp rod thereby bringing the clamp rod taper portion into engagement with the index table taper portion. The slidable member is biased in the upper direction by a spring housed within the sleeve so that after initial upward movement of the center column to bring the two taper portions into engagement, further upward movement of the center column effects compression of the spring thereby exerting a downward clamping force on the clamp rod to maintain the two taper portions in snug engagement during the processing of the workpiece held on the jig while the same is in the predetermined processing state.

8 Claims, 1 Drawing Figure

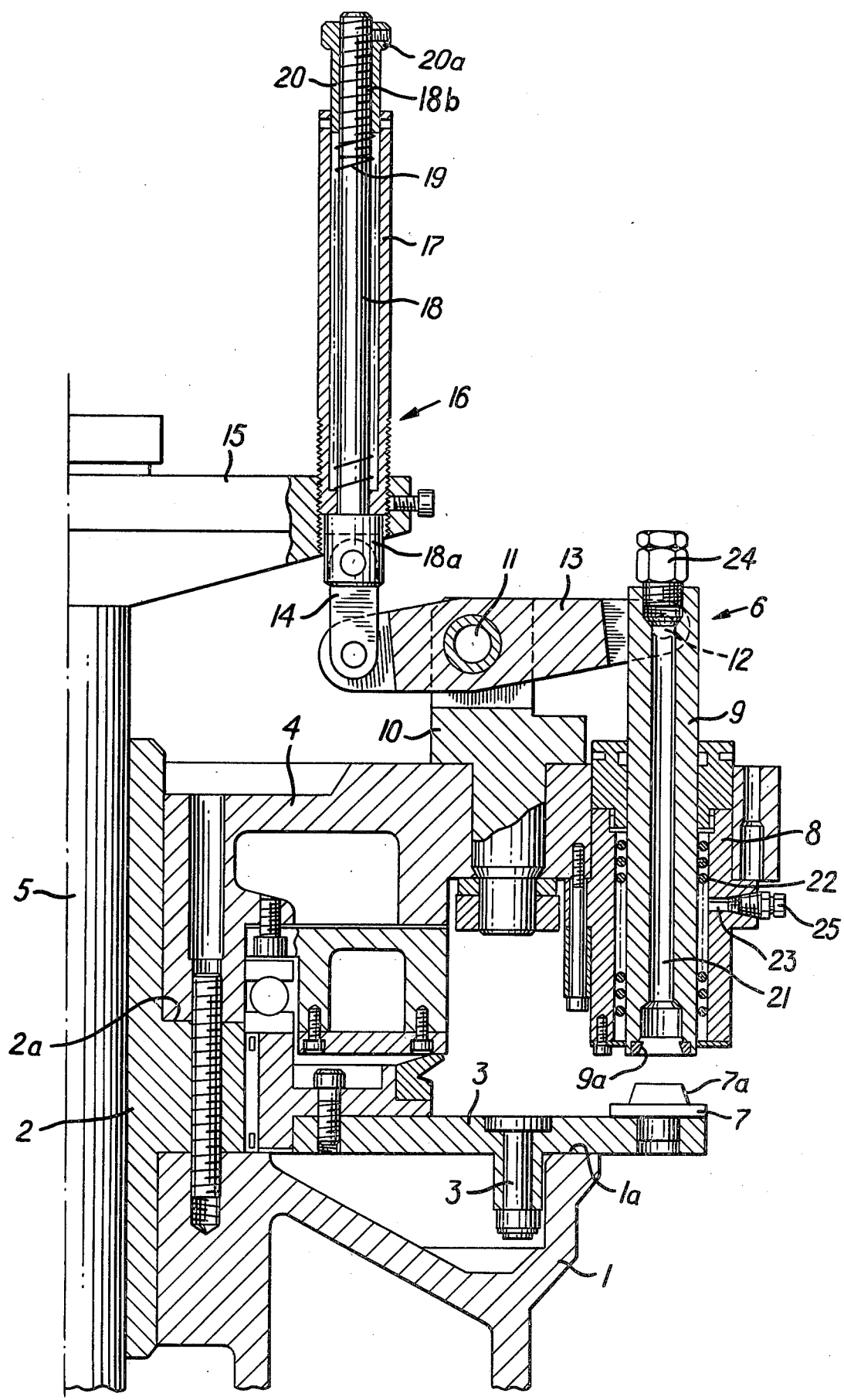

POSITIONING APPARATUS FOR INDEX TABLE IN CENTER COLUMN TYPE ROTARY INDEX MACHINE

BACKGROUND OF THE INVENTION

The present invention relates to a positioning apparatus for an index table in which the index table is clamped and unclamped by the vertical movement of a center column.

In a center column type high speed rotary index machine, power transmitting devices, e.g., a barrel cam or the like, incorporated in a lower casing of an index table engage with indexing pins provided on a lower surface of the index table, whereby the index table is incrementally and intermittently rotated by a driving motor, and the table is indexed at each incremental rotation for positioning. A fixed table is mounted on the index table, and upper processing units are provided on each processing station of the fixed table, and a center column arranged passing through the center of the index table and the fixed table is vertically moved in synchronization with the rotation of the index table. And each processing unit is fed to the processing positions of the index table by way of a link lever or the like, in accordance with the vertical movement of the center column, and the processing in each station is simultaneously performed.

In a conventional positioning apparatus for an index table in which the index table is clamped at each incremental rotation, taper pins are removably provided on power transmitting devices provided in a lower casing by way of a cam, and the index table is provided with positioning holes having a taper shape corresponding to the taper pins, whereby the index table is clamped by projecting the taper pins at the end of each incremental rotation to engage with the positioning holes.

However, since the lower casing houses the power transmitting devices of each part, and a processing unit and feeding device is also provided below the index table in this type of apparatus, there is not much space left for housing the positioning devices. As a consequence, pins are provided at only one portion and the clamping force is not so strong. When the index table is positioned, the force is concentrated on one portion upwardly since the force for lowering the table is always applied, whereby the positioning accuracy is deteriorated, and the positioning apparatus is complicated.

The present invention aims to eliminate the above noted drawbacks, and therefore it is an object of the present invention to provide a positioning apparatus for an index table in which positioning units are mounted on a plurality of positions of a fixed table around a movable center column, and actuated utilizing the vertical movement of the center column, whereby the index table is clamped from the upper direction.

BRIEF EXPLANATION OF THE DRAWINGS

The FIGURE shows a cross-sectional view of the upper structure of a rotary index machine according to the present invention.

DETAILED DESCRIPTION OF PREFERRED EMBODIMENT

Hereinafter an embodiment of the present invention will be illustrated in detail in conjunction with the drawing.

The FIGURE shows the upper structure of a rotary index machine according to the present invention. The machine comprises lower casing 1 having a boss portion 2 projecting from a center of the casing 1. An index table 3 of disk shape is movably mounted on a table surface 1a of the casing 1 and is incrementally rotated around an outer periphery of the boss portion 2 in an intermittent stepwise manner by engaging indexing pins with a barrel cam (not shown) provided inside the casing. A fixed table 4 of disk shape is located above the index table 3 and fixed to a step portion 2a of the boss portion 2, and movable center column 5 is mounted to undergo vertical reciprocal movement in synchronism with the incremental rotation of the index table 3.

The fixed table 4 is equally divided into 40 processing stations, in which 20 stations are idle stations and the remaining 20 stations are work stations provided with upper processing units (not shown) for processing workpieces. Further, a positioning apparatus 6 is mounted at plural ones of the processing stations, either at the idle stations or the work stations for precisely positioning the index table 3 at the processing stations. A similar positioning apparatus 6 is located on the other side of the center column 5 and such has not been illustrated since it has the same construction as the one shown in the drawing.

Jig plates 7 of the same number as the processing stations are attached to the outer periphery of the index table 3 at locations corresponding to the processing stations.

The positioning apparatus 6 is located at the outer periphery of the fixed table 4 and comprises a sleeve 8 disposed above the jig plate 7, a clamp rod 9 inserted slidably into the sleeve 8, a fulcrum bearing portion 10 fixed on the fixed table 4, and a link lever 13 having a different lever ratio from the processing units, (not shown) and being pivotally supported by a fulcrum pin 11 of the fulcrum bearing portion 10. One end of the link lever 13 is connected to the clamp rod 9 via a pin 12 and the other end of the lever 13 is connected via a flat link 14 to a connector 16 which passes through is and fixed to a working plate 15 fixed secured to the upper end of the center column 5.

The connector 16 comprises a sleeve 17 vertically screwed through the working plate 15, a working member 18 slidably extending through the sleeve 17 and having a forked rod end 18a at the lower end thereof in contact with the lower end surface of the sleeve 17 to restrict the lifting position of the working member 18, the rod end 18a being pivotally connected to one end of the flat link 14, and a compressed coil spring 19 surrounding the outer periphery of the working member 18 inside the sleeve 17 to bias the member 18 upwardly as shown in the drawing. An adjusting nut 20 is screwed on a screw portion 18b of working member 18 and the lower end of the nut 20 defines a seat for the upper end of the spring 19. The nut 20 is provided with a flange 20a at the outer periphery thereof for making contact with the upper end of the sleeve 17 when the working member 18 descends to restrict the lowest position thereof. The working member 18 is always biased upwardly in the sleeve 17 by the spring pressure of the spring 19.

The jig plate 7 has a workpiece (not shown) fixed at the center thereof and is provided at the upper outer periphery with a taper portion 7a. Correspondingly, the clamp rod 9 is provided at its lower end with a taper portion 9a having an inner diameter which is the same as the outer diameter of the taper portion 7a, and an oil hole 21 extending longitudinally through the center thereof.

Reference numeral 22 denotes stroke balls provided between the sleeve 8 and the clamp rod 9, numeral 23 denotes an oil hole provided in the sleeve 8, and numerals 24 and 25 respectively denote nipples to connect oil hoses to the oil holes 21 and 23.

In the FIGURE, the index table 3 is shown in the position of having just completed one incremental rotation and the center column 5 is at the lowermost position.

In operation, each processing unit (not shown) is fed by lifting the center column 5 from the lowermost position. The stroke of the lever ratio of the link lever 13 of the positioning device 6 is set to be larger than the stroke of the link levers which link the other processing units to the center column 5.

Accordingly, as the center column 5 lifts from the position shown in the FIGURE, the clamp rod 9 firstly descends at the initial step of the feeding of each processing unit, and the taper portion 9a fits over and contacts the taper portion 7a of the jig plate 7 so that the plural portions of the index table 3 at which are located the positioning apparatus 6 are clamped by the engaging portions 7a and 9a and the table 3 is pressed against the surface 1a of the lower casing 1, whereby the index table 3 is precisely positioned.

As the center column 5 lifts further from the above clamping state, the processing units of each station are fed and the workpieces on the respective jig plates 7 are simultaneously processed. At the same time, the working member 18 of the connector 16 is urged downward against the biasing pressure exerted by the spring 19, whereby the clamping force of the spring 19 acts on the index table 3 during processing.

When the center column 5 subsequently descends, each processing unit moves from its processing position, and then the lower end of the working member 18 contacts with the lower end surface of the sleeve 17, whereby the link lever 13 pivots in the reverse direction as the center column 5 nears its lowermost position to unclamp the clamp rod 9 from the jig taper portion 7a.

While the upper portion of the jig plate 7 is provided with a taper surface 7a and the taper hole 9a is provided at the end of the clamp rod, and the index table is clamped at the processing position for positioning in the above embodiment, it is to be noted that the index table may be provided with a taper hole for positioning thereon separately to push the clamp rod along with the taper.

As understood from the aforedescribed embodiment, in the positioning apparatus for an index table according to the present invention, the positioning units are provided at a plurality of positions and are actuated utilizing the vertical movement of the center column, whereby the clamping force is stronger in comparison with the conventional type in which the index table is positioned at the bottom thereof at only one location. According to the invention, since the index table is positioned at plural portions, the eccentric load applied to the index table by the plural positioning units offset each other. The eccentric load is applied to table surface of the lower casing from the above so that the positioning accuracy is improved in comparison with the type the eccentric load is applied from downward.

In this invention the positioning units can be mounted utilizing arbitrary empty or idle stations of the fixed table, and since the energy for actuating the positioning units is transmitted from the center column, the structure for positioning is exceedingly simplified.

I claim:

1. In a center column type rotary index machine having an index table which is intermittently rotated in angular increments during use of the machine to position a jig mounted on the index table at predetermined processing stations and having a vertically movable center column which undergoes upward and downward movement relative to a fixed frame portion of the machine, the improvement comprising:

positioning means operable during vertical upward movement of the center column for effecting positioning of the index table such that the jig is precisely positioned at one of the processing stations, the positioning means comprising a sleeve secured to the fixed frame portion of the machine, a clamp rod slidably mounted in the sleeve to undergo slidable movement toward and away from the index table, means defining a taper portion at the lower end of the clamp rod and a complementary-shaped taper portion on the index table, the two taper portions being positioned such that when the taper portions are vertically aligned with each other the jig on the index table is precisely positioned at the one processing station, a link lever pivotally mounted on the fixed frame portion of the machine and having one lever arm pivotally connected to the upper end of the clamp rod and another lever arm, and spring-biased connecting means pivotally connecting said another lever arm to the center column such that initial upward movement of the center column acts in conjunction with a predetermined spring bias force to effect pivotal movement of the link lever in one direction to cause downward movement of the clamp rod to thereby move the two taper portions into engagement and further upward movement of the center column effects an increase in the spring bias force to effectively clamp the clamp rod taper portion to the index table taper portion.

2. A center type rotary index machine according to claim 1; wherein the clamp rod taper portion comprises a tapered opening and the index table taper portion comprises a tapered projection shaped to fit into the tapered opening.

3. A center type rotary index machine according to claim 2; wherein the spring-biased connecting means comprises a sleeve affixed to the center column for movement therewith, a slidable member slidably mounted in the sleeve, means pivotally connecting the lower end of the slidable member to said another lever arm, and spring means biasing the slidable member upwardly in the sleeve so that when the center column is in its lowermost position the clamp rod taper portion is vertically spaced from the index table taper portion.

4. A center type rotary index machine according to claim 3; wherein the slidable member has an upper end projecting upwardly out of the sleeve, and stop means on the slidable member upper end for restricting the extent of sliding movement of the member relative to the sleeve during upward movement of the center column.

5. A center type rotary index machine according to claim 3; wherein the spring means comprises a coiled compression spring disposed within the sleeve and around the slidable member.

6. A center type rotary index machine according to claim 1; wherein the spring-biased connecting means comprises a sleeve affixed to the center column for movement therewith, a slidable member slidably mounted in the sleeve, means pivotally connecting the lower end of the slidable member to said another lever arm, and spring means biasing the slidable member upwardly in the sleeve so that when the center column is in its lowermost position the clamp rod taper portion is vertically spaced from the index table taper portion.

7. A center type rotary index machine according to claim 6; wherein the slidable member has an upper end projecting upwardly out of the sleeve, and stop means on the slidable member upper end for restricting the extent of sliding movement of the member relative to the sleeve during upward movement of the center column.

8. A center type rotary index machine according to claim 7; wherein the spring means comprises a coiled compression spring disposed within the sleeve and around the slidable member.

* * * * *